United States Patent [19]

Cummiskey et al.

[11] Patent Number: 5,506,781
[45] Date of Patent: Apr. 9, 1996

[54] RF LINK CONTROL OF SATELLITE CLOCKS

[75] Inventors: Peter Cummiskey, Clark, N.J.; Marvin A. Epstein, Brooklyn, N.Y.; Lawrence J. Doyle, Hazlett, N.J.

[73] Assignee: ITT Corporation, New York, N.Y.

[21] Appl. No.: 253,722

[22] Filed: Jun. 3, 1994

[51] Int. Cl.$^6$ .................................................. H04B 7/19
[52] U.S. Cl. ......................... 364/459; 342/356; 342/358
[58] Field of Search ................................. 364/459, 449, 364/454, 569; 343/112 R, 6 R; 342/433, 353, 357, 358, 352, 356, 463; 375/1; 455/10

[56] References Cited

U.S. PATENT DOCUMENTS

| | | | |
|---|---|---|---|
| 3,643,259 | 2/1972 | Entner | 343/112 R |
| 4,232,313 | 11/1980 | Fleishman | 343/6 R |
| 4,647,935 | 3/1987 | Helbling | 342/433 |
| 4,932,070 | 6/1990 | Waters et al. | 455/10 |
| 5,017,926 | 5/1991 | Ames et al. | 342/353 |
| 5,041,833 | 8/1991 | Weinberg | 342/357 |
| 5,126,748 | 6/1992 | Ames et al. | 342/353 |
| 5,289,497 | 2/1994 | Jacobson et al. | 375/1 |
| 5,343,209 | 8/1994 | Sennott et al. | 342/357 |

OTHER PUBLICATIONS

"NAVSTAR: Global Positioning System—Ten Years Later", by B. W. Parkinson, Proceedings of the IEEE, vol. 71, No. 10, Oct. 1983.

Radar Handbook, Kalman Filter discussion edited by Merrill Skolnik, 2d ed., McGraw-Hill Inc., 1990, Chapter 8, pp. 8.28 through 8.30.

Primary Examiner—Kevin J. Teska
Assistant Examiner—Russell W. Frejd
Attorney, Agent, or Firm—Plevy & Associates; Patrick M. Hogan

[57] ABSTRACT

A system and method for maintaining a precise time standard among a system of orbiting satellites is disclosed. In an illustrative embodiment, atomic clock data is circulated among the satellites via RF crosslinks. Each satellite uses the received data as input to a Kalman process which acts to minimize the mean squared error among the satellite clocks to form a set of "ensemble clocks". The resulting ensemble clock values are then transmitted to an earth station where an offset between the ensemble clocks and Universal Time is computed. The offset is transmitted from the earth station to the satellites where it is used by the satellites to lock their on-board clocks to Universal Time, thereby creating a corrected system time. The corrected system time is transmitted, via RF crosslinks, to satellites not having operational on-board clocks. The satellites without atomic clocks employ phase locked loops to anchor their clocks to the corrected system time as it is received over the crosslinks.

20 Claims, 10 Drawing Sheets

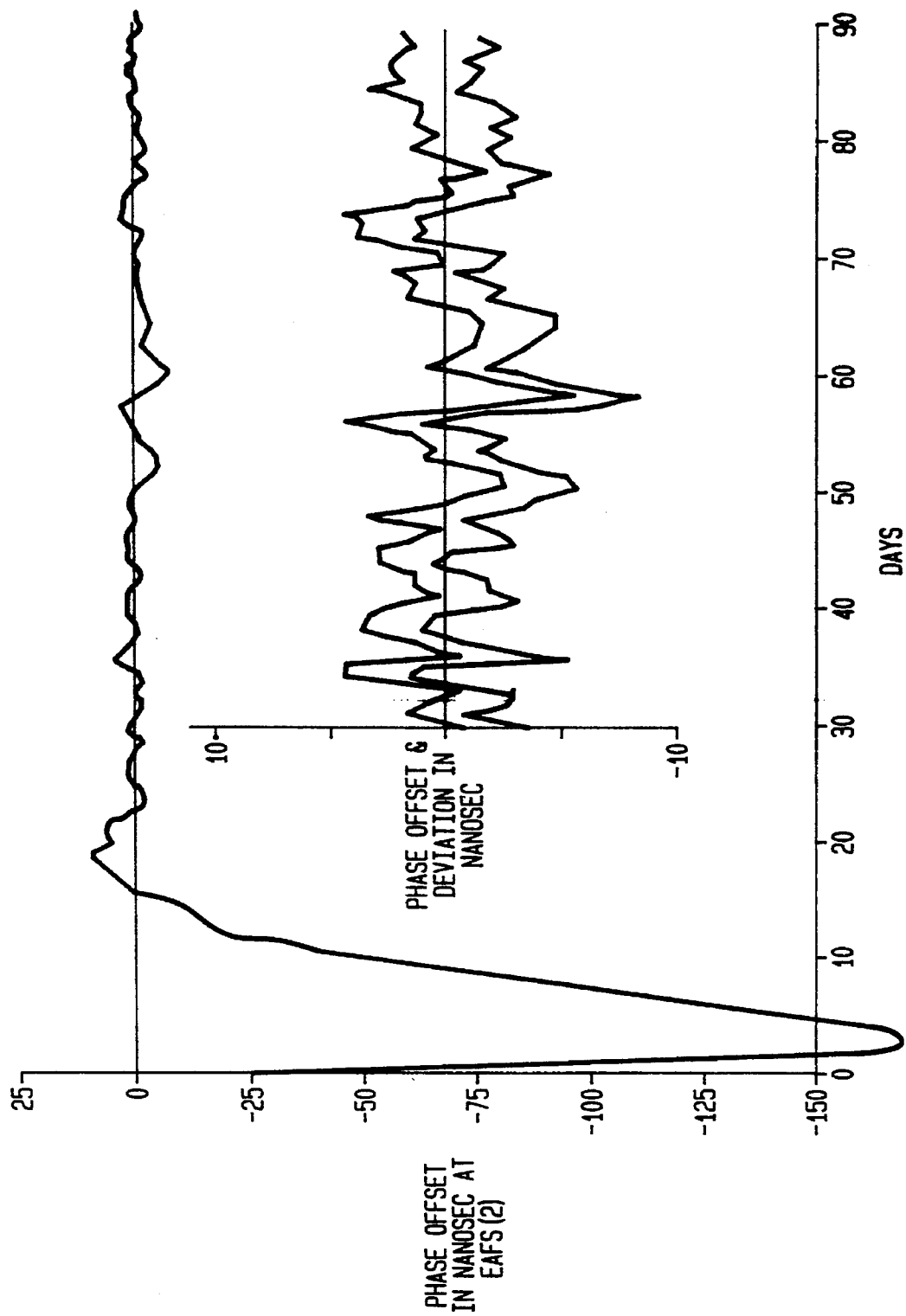

RF LINK CONTROL OF SATELLITE CLOCKS

FIELD OF THE INVENTION

This invention relates to clock synchronization, and more particularly to a system and method for synchronizing clocks on board a plurality of orbiting satellites.

BACKGROUND OF THE INVENTION

In the art of earth-orbiting satellites it is known to establish a plurality of such satellites operating together as a system in order to carry out one or more system tasks, such as communication, mapping, or position determination. Frequently it is necessary that particular operations of each satellite comprising such a system be keyed to a precise time reference which should be uniform across the entire system. This requirement has generally been met by the placement of a highly accurate and stable clock in each such satellite. To guard against failure of such satellite clocks, each satellite has also been provided with one or more redundant standby clocks which may be activated in the event of such a failure. The placement of at least two such highly accurate and stable clocks in each satellite comprising such a system involves a very substantial expense to the system operator and a significant weight penalty which is manifested in higher launch costs. The present invention provides a system and method for maintaining synchronization of on-board clocks in such a system of orbiting satellites at a previously unrealized level of stability and accuracy and without the necessity for the redundant clocks used in prior art systems. The system and method of the invention further includes an optional elimination altogether of the highly accurate and stable clocks, and the attendant expense and weight associated with such clocks, from a portion of the satellites comprising such a satellite system.

At this point it is noted that a preferred embodiment of the invention is an application thereof in the Global Positioning System (GPS). Accordingly, to better illustrate the operation of the invention, the invention will be described in the context of a GPS application. As a predicate, the operation and characteristics of the GPS will be briefly described.

The GPS is a navigational system that makes use of state of the art satellite technology to provide users with a valuable tool for determining position. The system allows a navigator to rapidly determine his position by means of a small "GPS receiver", regardless of the navigator's position on the earth, and with a great deal of accuracy (usually within a few hundred feet. Such a system possesses many advantages that may benefit both civilian and military users. In the civilian setting, for example, a lost motorist who is equipped with a GPS receiver could pinpoint his position and take corrective measures. The system offers even greater benefits for the captain of a ship. Since the captain has fewer alternative methods of navigation than the motorist, he is more dependant on the information provided by his GPS receiver. In the military setting, the implications of the GPS are more vividly demonstrated. For example, the captain of a submarine carrying ballistic missiles can use GPS information to quickly obtain and accurately determine his submarine's latitude and longitude. Once the submarine's position has been accurately determined the trajectory to a target of known position can be computed and a missile can be deployed. The foregoing examples illustrate the value of the GPS and demonstrate how those who rely on the system must depend on its accuracy and reliability.

The Global Positioning System is composed of a plurality of satellites orbiting at approximately 11,000 nautical miles above the earth and maintained in almost perfectly circular orbits. These orbits are chosen so that the system can provide information to a user regardless of the time that the user requests information and regardless of the user's position on the earth's surface. Four of the orbiting satellites must be "visible" to the user at any one time in order for a position determination to be made. The satellites continuously broadcast their trajectory, clock offsets and radio-ranging signal. Once the GPS receiver has the range to each of four satellites, and the position of those four satellites, a determination of the receiver's position may be made.

A GPS receiver determines position by employing a three-dimensional equivalent of the traditional "triangulation" technique. Triangulation is the navigational technique whereby a platform on the earth's surface may compute its latitude and longitude by using only its range relative to two reference points of known position. In the GPS scenario, the platform may compute its latitude, longitude, and, if needed, its altitude by using its range relative to three satellites of known position. The additional coordinate of altitude may be required by those platforms not constrained to operation on the earth's surface. In theory, the three coordinates describing the user's position can be determined from three range measurements since the three measurements will yield three equations, three equations being sufficient to solve for three unknowns. However, in practice, the user clock always differs from the system clock, introducing a fourth unknown, namely the system time. Thus a practical implementation of the GPS position finding function requires that four range measurements be made. The range of the GPS receiver to four different satellites is computed so that four equations are then available for establishing a fix. From these four equations it is possible to determine the user clock offset as well as the three unknown coordinates.

A method which may be used to compute the range to a satellite involves the transmission by each satellite of an encoded pulse of electromagnetic energy. The pulse will be incident upon the receiver after a delay that is proportional to the distance from the satellite to the receiver. The pulse is then decoded by the receiver to determine the identity of the transmitting satellite, the time of transmission, and the position of the satellite at the time of transmission. When four such pulses are simultaneously transmitted, one by each of four different satellites, the receiver can calculate its range to each of the four satellites at the time of transmission and, from those ranges and the known positions of the satellites, may then calculate its position relative to the earth.

One of the larger sources of error in the receiver's position calculation is the variation in the time standards on board each satellite. A variation in the satellite time standards will cause the actual transmission times of the satellites to vary since each satellite keys its transmission from its own internal clock. A variation in the actual transmission times means that the measured ranges of the satellites will change between actual transmissions. Thus, the range of the satellite reference coordinates from which the GPS receiver calculates its position will not be accurately known. The inaccuracy in the range satellite makes an error free determination of the receiver's position impossible.

To reduce the errors caused by clock variation, the GPS satellites are equipped with atomic clocks which maintain highly accurate time standards based on atomic frequencies. Currently, each GPS satellite contains three such atomic clocks. As previously indicated, multiple atomic clocks are employed on each satellite to increase the operating life of the system by providing backup in the event that some of the clocks fail. These atomic clocks are very expensive and contribute significantly to the overall cost of the system. Accordingly, a timing method that would achieve a reduction in the number of atomic clocks required, without an accompanying reduction in performance, would greatly increase the cost efficiency of the GPS.

SUMMARY OF THE INVENTION

It is an object of the present invention to reduce the number of atomic or other highly accurate and stable clocks per satellite, in a system of such satellites requiring a synchronized time reference, while maintaining the operating life by allowing some such satellites to operate with no atomic clocks.

It is the further object of the invention to maintain a tightly synchronized set of clocks which deviate from each other much less than the atomic clocks and are locked to a universal time code standard maintained on earth.

The object of maintaining a tightly synchronized set of atomic clocks is achieved by way of communications between the individual satellites and between the satellites and an earth station. Satellites having atomic clocks communicate with each other via crosslink radio channels. Through a Kalman process running at each satellite, a phase offset is computed for each atomic clock. The phase offset computed at any one satellite is added to that satellite's atomic clock. The resulting set of clock values, called the "ensemble clocks", has the property that the mean squared error among the clocks forming the set is minimized. Successive iterations of the Kalman process are performed to maintain the coupling between the local iterations of the Kalman process are performed to maintain the coupling between the local ensemble clock at each satellite and the ensemble clocks of the other satellites as such data is received over the crosslink channels.

The satellites with atomic clocks transmit their ensemble times to an earth station via a first band of radio frequencies. The earth station then calculates the average offset of the ensemble clocks from Universal Time and transmits the offset to the satellites via a second band of radio frequencies. The offset is used by each satellite to compute a steering signal which, in turn, is used to lock the ensemble clocks to Universal Time, thereby creating a corrected clock value.

The object of allowing some satellites within the system to operate with no atomic clocks is achieved by performing intersatellite clock phase measurements of the corrected clock value from those satellites having atomic clocks by those satellites that do not have atomic clocks. Intersatellite clock phase measurements can be performed by taking the difference of bi-direction pseudo-range measurements between a pair of satellites. The satellites without atomic clocks each process the received corrected clock value through a phase locked loop. Each phase locked loop generates an error signal proportional to the difference between the phase of the received corrected clock signal and the phase of a local voltage controlled oscillator. This error signal is fed back to the oscillator input, completing a feedback loop which forces the frequency and phase of the voltage controlled oscillator to track the frequency and phase of the received corrected clock signal. By using the output of the voltage controlled oscillators as its clock signal, a satellite with no on board atomic clocks will remain locked to the corrected clock signal.

BRIEF DESCRIPTION OF THE DRAWINGS

FIG. 5 is a graph depicting the transient and steady state response of ensemble clocks of a simulated Global Positioning System employing the invention, the System being composed of 24 satellites, 23 having on-board atomic clocks.

DETAILED DESCRIPTION

As previously indicated, a preferred embodiment of the invention is an application of the system and method of the invention to the Global Positioning System. Accordingly, the characteristics and operation of the invention will hereafter be described in the context of GPS operation.

Figure 1:
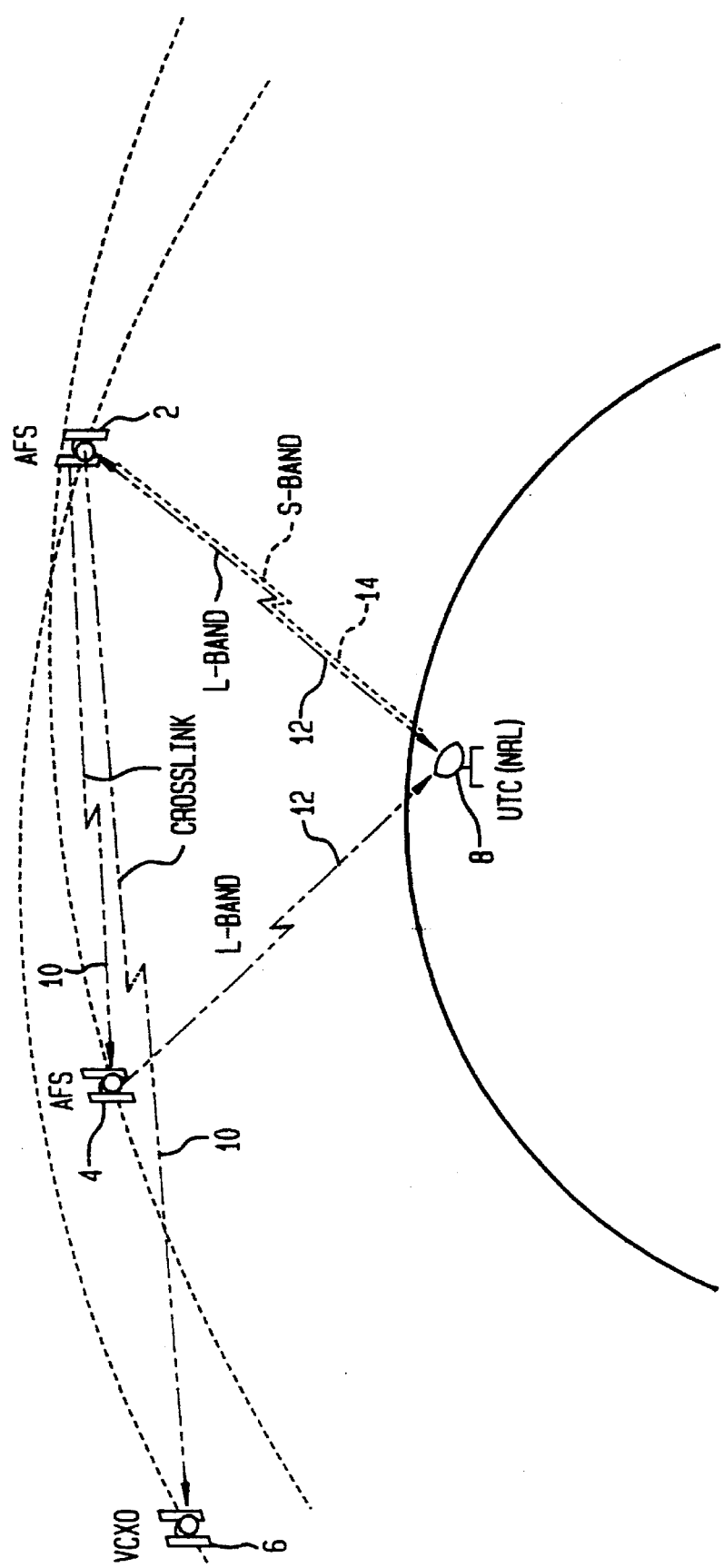
FIG. 1 is a plan view of a system of orbiting satellites, showing a plurality of communication links between satellites.

Referring now to FIG. 1, three satellites 2, 4, 6, and an earth station 8 comprising part of a Global Positioning System are shown. For purposes of illustrating the present invention, a first satellite 2 and a second satellite 4 have on-board atomic clocks. A third satellite 6 does not have an on-board atomic clock. Satellites 2 and 4 each maintain an ensemble clock which is equal to the satellite's atomic clock phase plus a phase offset. The satellites broadcast their ensemble clock values simultaneously and at uniform intervals. When a satellite that is visible to a broadcasting satellite receives a transmission, it runs a Kalman measurement algorithm on the received data in order to compute an updated phase offset at the receiving satellite. The updated phase offset is added, in turn, to the atomic clock phase of the receiving satellite, thereby producing an updated ensemble clock at the receiving satellite. Successive iterations of the Kalman process are performed to maintain the coupling between the local ensemble clock of each satellite and the ensemble clocks of the broadcasting satellites as such data is received from broadcasting satellites. By coupling the ensemble clocks through a Kalman process, the mean squared error among the ensemble clocks is minimized. For a detailed description of how a Kalman algorithm minimizes the mean squared error inherent in tracking a set of data, see: Kalman, R. E., "A New Approach to Linear Filtering and Prediction Problems", *J. Basic Eng.* (ASME Trans., ser. D), vol 82, pp. 35–45, March 1960. An example of a Kalman tracking algorithm can be found in: *Radar Handbook*, edited by Merrill Skolnik, 2d edition, published by McGraw Hill, Inc. (1990) (see Chapter 8, entitled "Automatic Detection, Tracking, and Sensor Integration" by G. V. Trunk). The Kalman algorithm may be implemented in software or it may be implemented in hardware using a commercially available microprocessor or dedicated processing circuitry. Through the use of the Kalman algorithm and crosslink communications to propagate clock data among the satellites, the GPS can maintain a tightly synchronized set of ensemble clocks.

Figure 2:
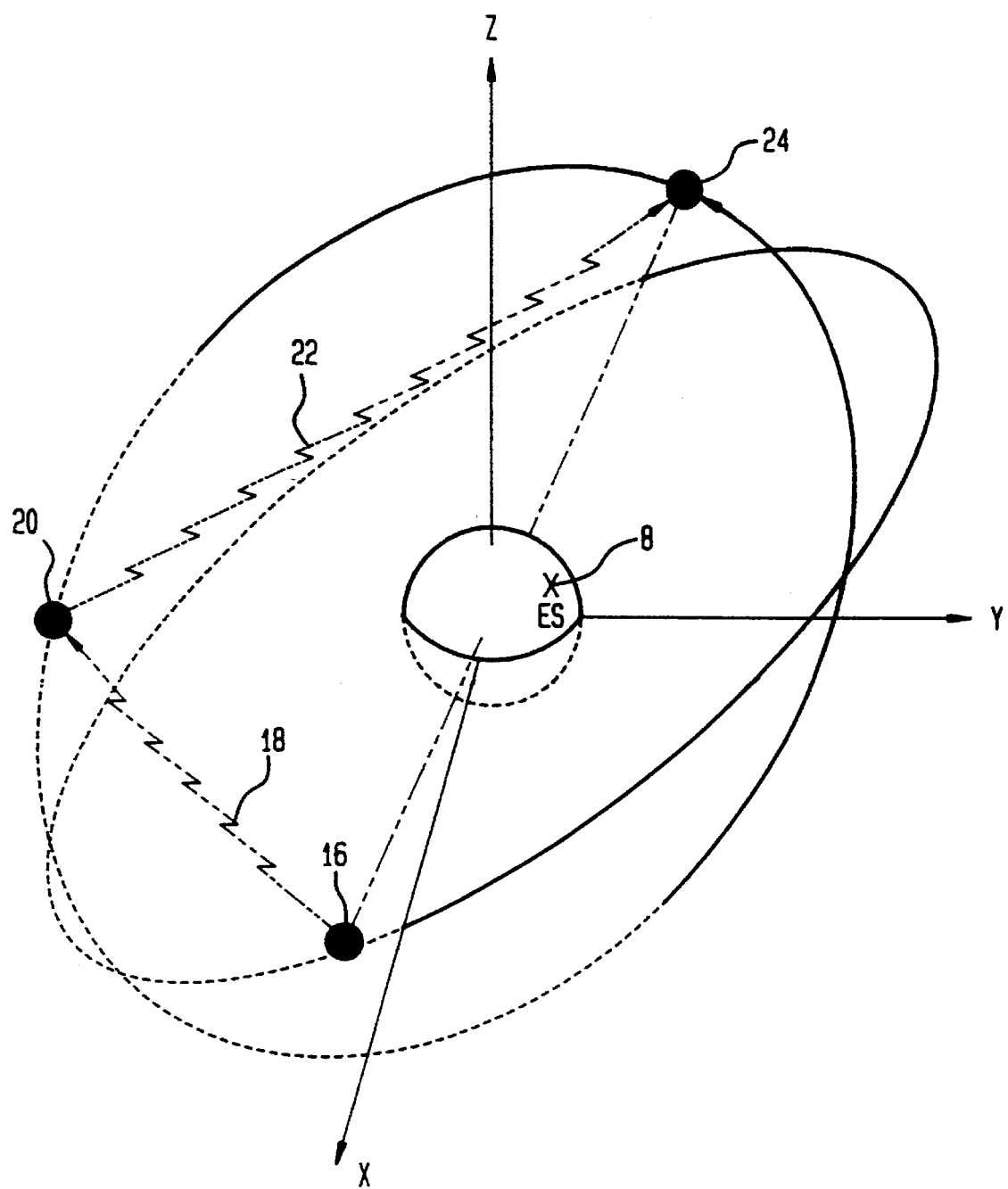
FIG. 2 is a plan view of a system of orbiting satellites, showing orbiting satellites, the earth, and an earth station.

Not all satellites will be visible to broadcasting satellites at the time of transmission. However, communication between satellites which are not visible to each other may be accomplished by routing transmissions through satellites which are visible to each other. This technique is illustrated in FIG. 2, wherein a signal from a first satellite 16 is transmitted to a second satellite 20 via a crosslink communication channel 18. The data received by the second satellite 20 is then relayed to a third satellite 24 via a second crosslink 22. In this manner, the clock data from the first satellite 16 can be propagated to the third satellite 24, even though the third satellite 24 is not visible to the first satellite 16 at the time of transmission.

Referring further to FIG. 2, it can be seen that the satellites make periodic transmissions of their ensemble clock values to an earth station 8. These transmissions are subject to visibility constraints and may be made at the same time that the satellites carry out their normal navigation function. In this way, the earth station 8 would receive ensemble time and ephemeris parameters from visible satellites via a radio link, such as an L band channel 12. The earth station 8 uses the received ensemble time to compute an average phase offset from Universal Time and then transmits the computed phase offset to visible satellites via another radio link, such as an S band channel 14. The S band transmissions to visible satellites may occur once every 12 hours, at which time data is circulated to invisible satellites via the crosslink channels 10. The offsets received from the earth station 8 are used by the satellites with atomic clocks, satellites 2 and 4, to lock their ensemble clocks to Universal Time. In turn, the satellite having no atomic clock (or a failed atomic clock), satellite 6, anchors its on-board clock to Universal Time through communication with the satellites having atomic clocks in a manner to be described hereafter.

Figure 3:
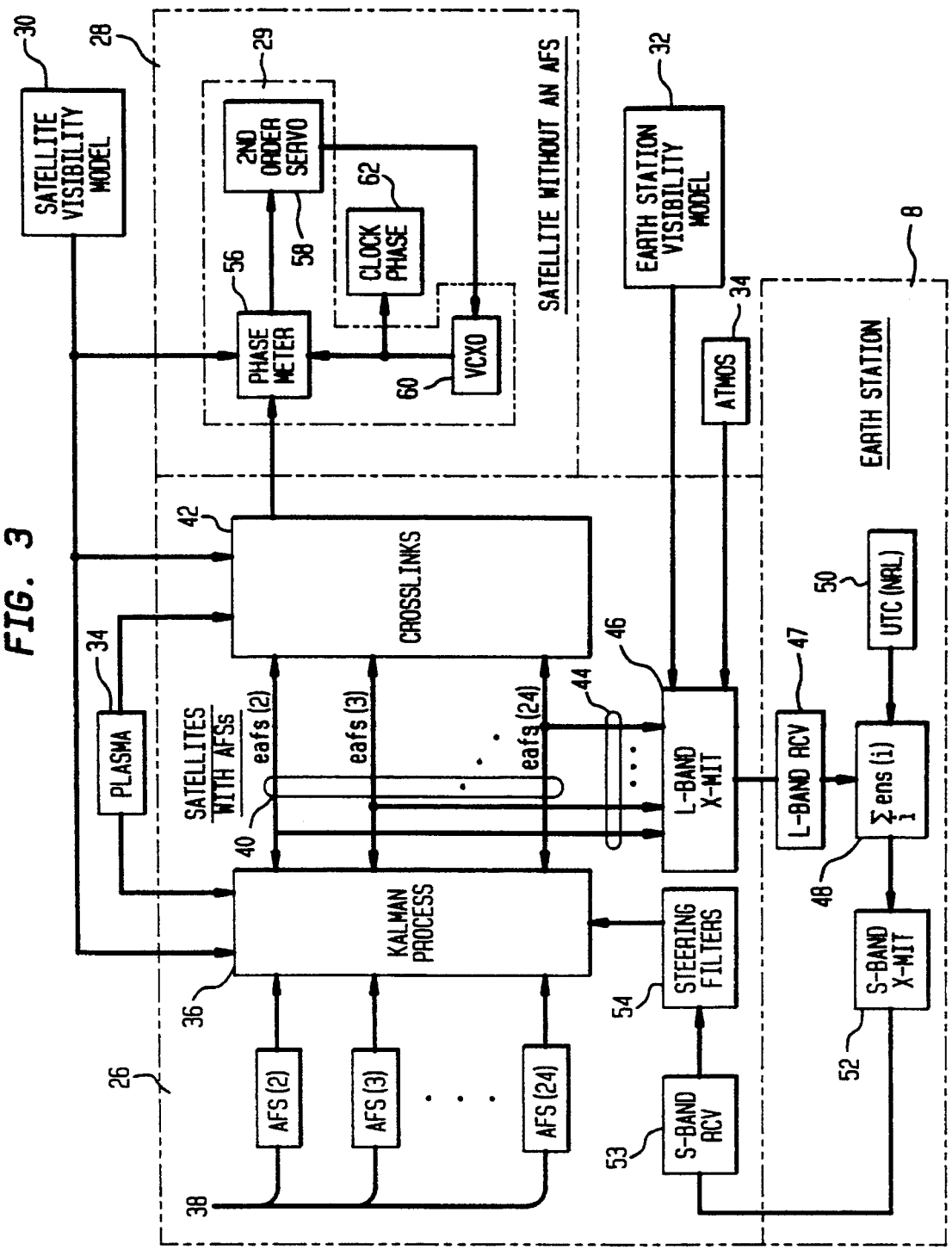
FIG. 3 is a schematic diagram of an embodiment of an RF Link Control for a system of orbiting satellites.

Referring to FIG. 3, a Global Positioning System may be modeled to include: a plurality of satellites with atomic clocks 26, at least one satellite without an atomic clock 28, a satellite visibility model 30, and earth station 8, an earth station visibility model 32, and noise sources 34. According to the present invention, the satellites with a atomic clocks 26 maintain a tightly synchronized set of ensemble clocks 40 by running a Kalman algorithm 36 on the phase differences between each satellite's ensemble clock and other ensemble clocks, which are visible to the satellite.

The clock data is communicated among the satellites via a plurality of crosslinks 42. The selection of a crosslink that is necessary to communicate information among any two satellites is a function of the satellite-to-satellite visibility, a factor that is represented in FIG. 3 by a satellite visibility model 30. The updated ensemble clocks 44 are then transmitted, along with satellite position information, through an L band transmitter 46 to an L band receiver 47 located at the earth station 8. Only those satellites visible to the earth station 8 at the time of transmission will be able to complete the L band transmission. This visibility limitation is accounted for in the system model through the inclusion of earth station visibility model 32. Also, transmission over the crosslinks 42 and L band channels 46 will be corrupted by noise. The effects of noise are included in the form of noise sources 34.

Referring further to FIG. 3, the earth station 8 computes an average offset 48 of satellite ensemble times 44 from Universal Time 50. The offset 48 is then transmitted to visible satellites via an S band transmitter 52, located at the earth station 8, and a plurality of S band receivers 53, located at the satellites having atomic clocks 26. The S band transmissions to visible satellites occur about once every twelve hours with communication thereof to invisible satellites through the crosslinks 42. The satellites with atomic clocks 26 filter the offset 48 through a steering filter 54. The output of the steering filter is run through Kalman process 36 to anchor the ensemble clocks to Universal Time.

In addition to providing for an improved time standard among satellites where each satellite has an on-board atomic clock, the present invention provides a system and method for maintaining an improved time standard among satellites where one or more satellites does not have an operational on-board atomic clock. In a system where not all satellites have operating atomic clocks (either by design or where one or more on-board atomic clocks have failed), the satellites not having atomic clocks receive the values of the ensemble clocks, as locked to Universal Time, from the satellites having atomic clocks. This is the system depicted in FIG. 3, wherein a satellite not having an atomic clock 28 is locked to the ensemble clocks 40 through a phase locked loop 29. The ensemble clock values are transmitted to the satellites not having atomic clocks via the crosslinks 42. The satellites not having atomic clocks are each equipped with a phase locked loop 29. By using the ensemble clock values as input to the phase locked loop 29, the output frequency and output phase of the loop 29 can be locked to the ensemble clock frequency and ensemble clock phase. It is the output of the phase locked loop 29 that is used as the clock signal by those satellites not having atomic clocks.

Figure 4:
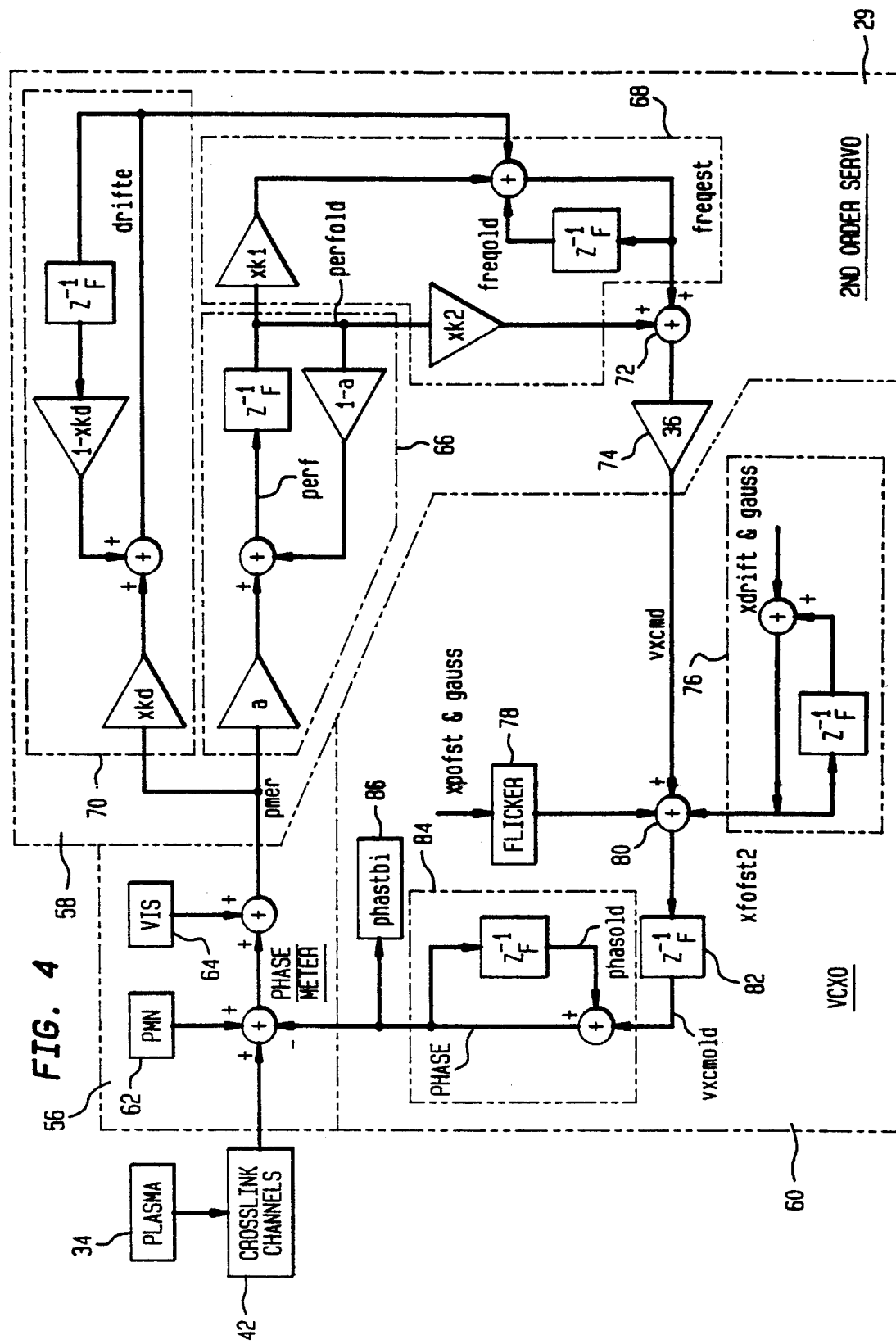
FIG. 4 is a signal processing diagram of a phase locked loop according to the system and method of the invention.

Referring to FIG. 4, a phase locked loop as incorporated in the invention may comprise, in cooperative arrangement, a phase meter 56, a 2nd order servo 58, and a voltage controlled oscillator (VCXO) 60. The phase meter 56 accumulates the differences between the phase at an input from VCXO 60 and the phase of the ensemble clocks as received over the crosslinks 42. The accumulation is subject to ambiguities in propagation delay, process timing, and visibility constraints—modeled as noise sources 34, 62, and 64, respectively. The accumulated phase meter error is passed through a smoothing filter 66—for removal of high frequency noise—to an estimator circuit 68. The phase meter error is also input to a drift compensation circuit 70 which generates a drift correction signal to compensate for frequency drift in the VCXO 60. Both the estimator 68 and the drift compensator 70 are operated at the GPS frame rate. Their outputs are added by adder 72 and multiplied by multiplier 74. The output of the adder 72 is a voltage that is proportional to the phase meter error, adjusted to compensate for VCXO 60 drift. The output of the adder 72 is multiplied by the GPS frame rate, typically 36 sec/frame, to convert from cycles per second to cycles per GPS frame, and then passed to the VCXO 60.

The VCXO 60 generates an output signal of a particular frequency and phase as determined by the VCXO 60 input voltage. This output signal is fed to the phase meter 56 for comparison to the ensemble clock phase received over the crosslinks 42. There are two primary degradations introduced by the VCXO 60, drift and flicker noise—modeled as noise circuits 76 and 78, respectively. Flicker noise 78 is simulated by filtering gaussian noise through a five stage lag-lead filter. Drift 76 is simulated by double integration on gaussian noise. The integrated drift noise 76, flicker noise 78, and multiplier 74 output are added by an adder 80. The adder 80 output is delayed by a delay element 82 and integrated by an integrator 84 to produce an output phase which is stored in a phase table 86. The phase stored in the phase table 86 is compared by the phase meter 56 to the ensemble clock phase received over the crosslinks 42, thus completing the feedback loop.

As will be understood, a Global Positioning System employing the present invention has a large advantage over the conventional GPS in that it provides for a tightly synchronized set of satellite clocks that are linked to universal time on earth, an advantage which results in an improvement in overall GPS performance. And, as described hereinabove, a further advantage of a Global Positioning System employing the present invention is realized through the use of phase locked loops to synchronize satellites that do not have operating atomic clocks. The use of phase locked loops, particularly in lieu of additional, redundant atomic clocks in a single satellite, allows for a reduction in system cost without an accompanying reduction in system performance.

In order to establish an added level of confidence that the system and method of the invention will perform as predicted, a software model of a Global Positioning System employing the RF Link Control was created. Using the software model, two separate simulations were conducted and in each simulation the performance data for the satellite clocks was recorded.

In the first simulation the modeled GPS is composed of 24 satellites, 23 of the satellites having atomic clocks and 1 satellite not having an atomic clock. Also, in the first simulation, broadcasting over the crosslinks was set at 6 minute intervals, earth station transmissions were set at 12 hour intervals, and the steering filter was set to average over 24 hours. The transient and steady-state responses of the ensemble clocks for the first simulation are shown in FIG. 5.

Figure 6:
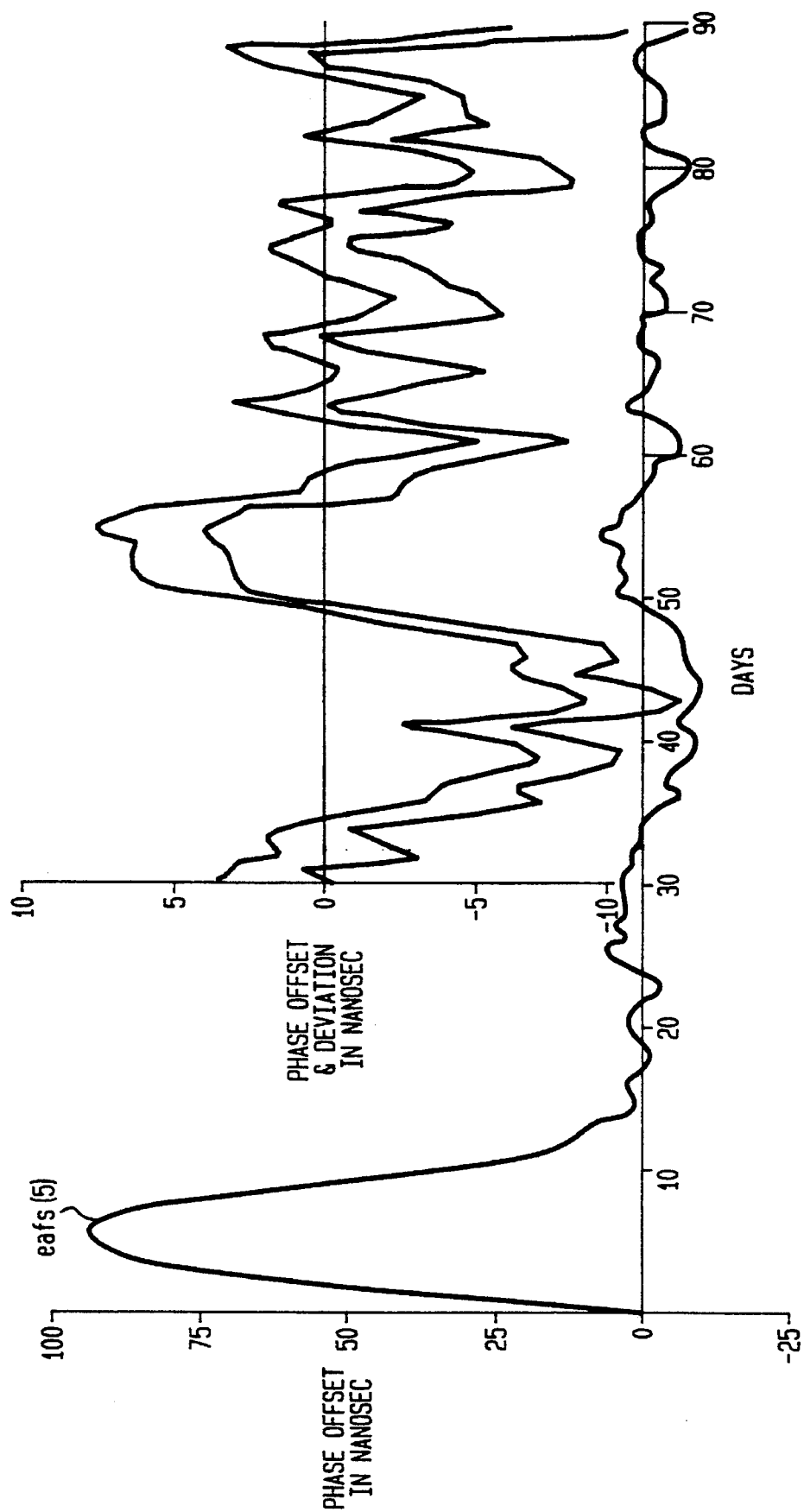
FIG. 6 is a graph depicting the transient and steady state response of ensemble clocks for a simulated Global Positioning System employing the invention, the System being composed of 24 satellites, 16 having on-board atomic clocks.

A second simulation was run in which the number of satellites having atomic clocks was changed to 16 and the number not having atomic clocks was changed to 8, all other parameters being unchanged. The transient and steady state responses of the ensemble clocks for the second simulation are shown in FIG. 6.

Figure 4A:
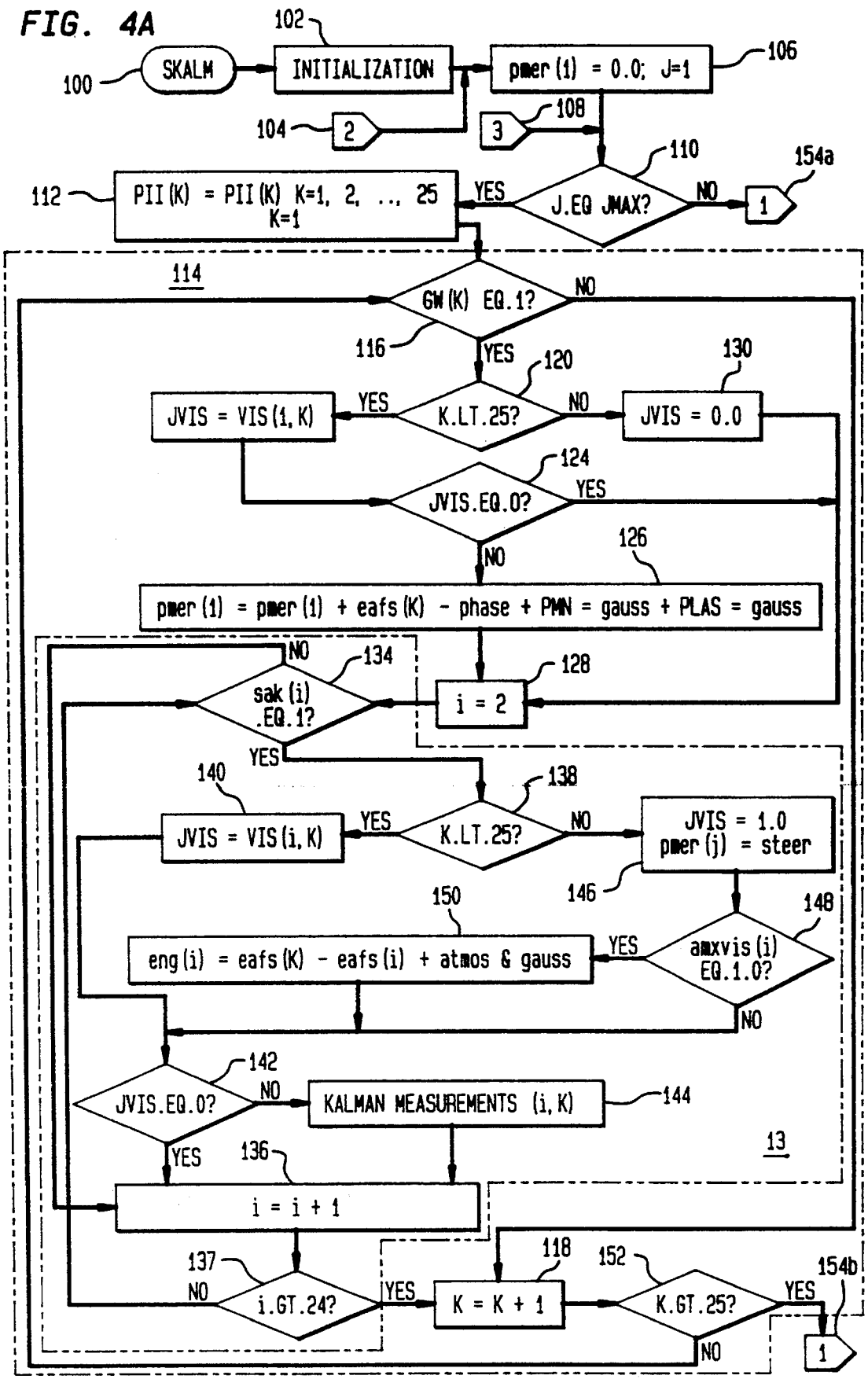
FIG. 4A is the first half of a flow chart showing the operational steps of a simulation of the current invention as implemented in a Global Positioning System.
Figure 4B:
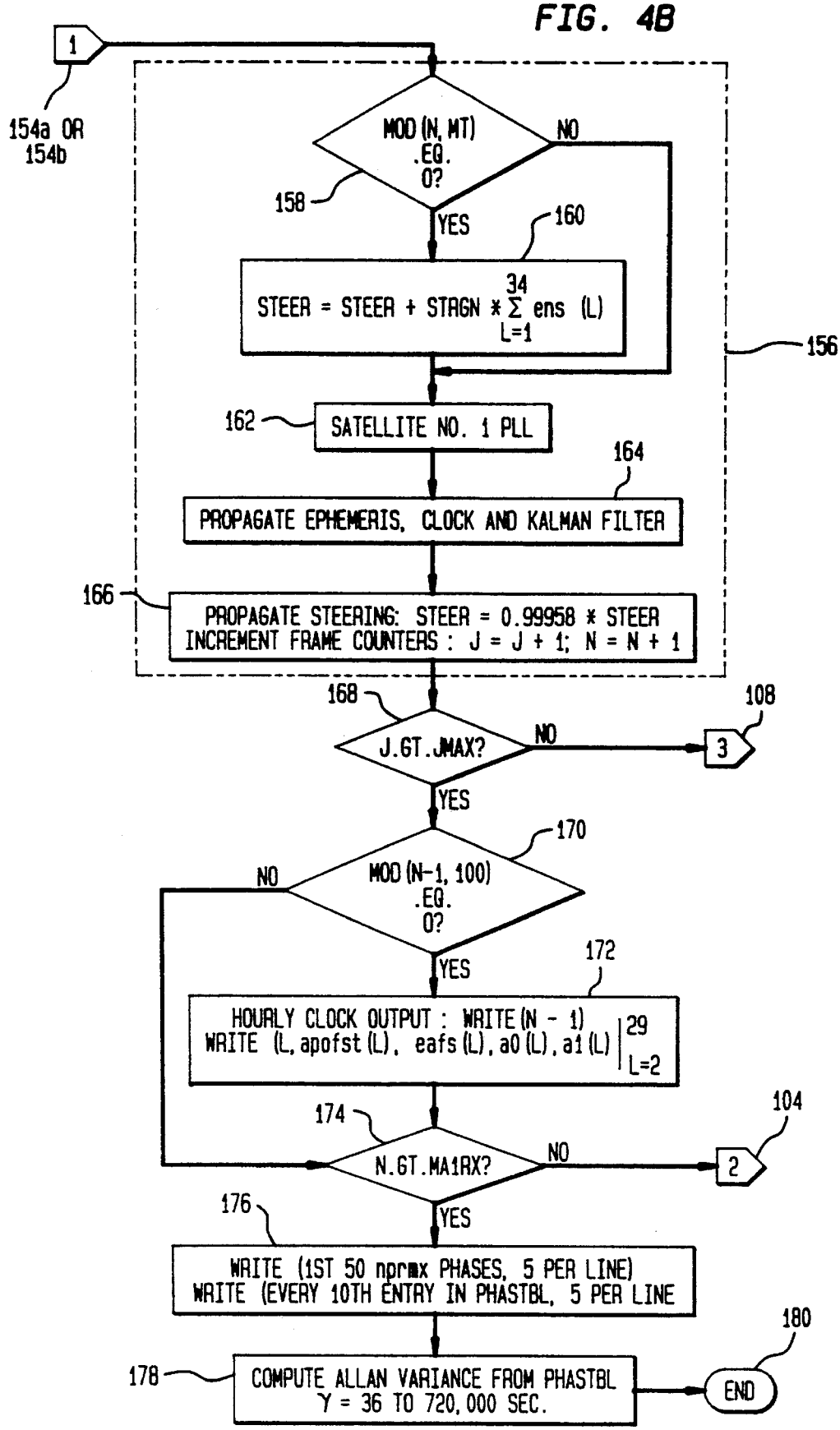
FIG. 4B is the second half of a flow chart showing the operational steps of a simulation of the current invention as implemented in a Global Positioning System.

Using the flow chart shown in FIGS. 4A and 4B, we will hereafter describe the process of the first simulation. Referring first to FIG. 4A, it can be seen that the simulation begins at step 100. An initialization procedure 102 is then performed prior to entering a main loop 104. The main loop 104 is traversed one time per transmission interval, the transmission interval being the period of time between transmissions by satellites having atomic clocks. At the beginning of the main loop a procedural step 106 is performed, in which the phase meter error at satellite No. 1—the satellite not having an atomic clock—is set to zero, and a frame counter, "j", is set to 1. The simulation program then enters a frame loop 108 which is traversed once per frame interval, the frame interval being the 36 seconds between updates of the ephemeris parameters. The frame counters are updated on each iteration of the frame loop 108.

Frame loop 108 begins with decisional step 110, in which a decision is made as to whether or not it is time for the satellites having atomic clocks to transmit their ensemble clock values to visible satellites and to the earth station. If it is time for such transmissions to occur, the simulation performs a procedural step 112, followed by entrance to a transmission loop 114. In step 112 the phase term in the Covariance Matrices, maintained by the Kalman processes at each satellite, are stored, and the loop counter is set to 1. In the transmission loop 114 the operations necessary to transmit ensemble clock data from the satellites having atomic clocks to satellite No. 1, transmit ensemble clock data between satellites having atomic clocks, and transmit from the earth station to the satellites having atomic clocks are performed. The program enters loop 114 once per transmission interval. That is, loop 114 is entered each time frame counter "j" multiplied by the frame rate (36 seconds) is equal to the transmission interval (6 minutes). Thus, until the simulation is terminated, the transmission loop 114 will be entered each time the frame counter "j" reaches 10.

Transmission loop 114 begins with a decisional step 116, in which a decision is made as to whether or not the satellite corresponding to the loop counter (i.e. satellite "k") has an atomic clock. If it does not, the program jumps to step 118 where the loop counter "k" is incremented. If satellite "k" does have an atomic clock, a decisional step 120 is performed, in which the program decides whether the loop counter is less than or equal to the total number of satellites in the system (in the described example, 24). If the counter is less than or equal to the total number of satellites in the system, the visibility of satellite "k" to satellite No. 1 is checked at step 122. At step 124 it is decided, based on the output of step 122, whether satellite "k" is visible to satellite No. 1. In the event that it is, the phase meter error at satellite No. 1 is updated, as shown by step 126, and the operation proceeds to step 128. If the loop counter "k" is greater than the total number of satellites in the system, then satellite "k" is said be invisible to satellite No. 1, via step 130, and the program proceeds to step 128.

At step 128 a counter "i" is set to 2 before a Kalman loop 132 is entered. In the Kalman loop 132, a Kalman measurement processes is run each time satellite "i" receives an ensemble clock transmission from satellite "k". A Kalman measurement process is also run each time a satellite "i" receives a timing offset from the earth station.

The first step in the Kalman loop is a decision step 134 that checks whether or not satellite "i" has an atomic clock. If satellite "i" does not have an atomic clock, the program jumps to step 136 where counter "i" is incremented. If satellite "i" does have an atomic clock, then decision step 138 is performed, where it is determined whether counter "k" is less than or equal to the total number of satellites in the system. If "k" is less than or equal to the total number of satellites in the system, then the visibility of satellite "i" to satellite "k" is checked in step 140 and a decision on visibility is made in step 142. If the satellites are not visible to one another, step 136 is performed. If they are visible to one another, then before performing step 136, a Kalman measurement is carried out at satellite "i" in step 144.

If, at step 138, it is decided that "k" is greater than the total number of satellites in the system, then satellite "i" is said to be visible to satellite "k" and the phase meter error is set to the steering signal in step 146. Decisional step 148 renders a decision on whether or not satellite "i" is visible to the earth station. If satellite "i" is visible to the earth station, then step 150 is performed prior to step 142. In step 150 the earth station measures the phase difference between Universal Time and the ensemble clock on satellite "i". Since satellite "i" is said to be visible to satellite "k", when "k" is greater than the total number of satellites, the program passes through step 142 to the step 144 where a Kalman measurement is carried out at satellite "i" using the steering signal. The program exits the Kalman loop 132 when "i" is greater than the total number of satellites in the system, step 137, otherwise the program jumps back to the beginning of the Kalman loop 132 at step 134.

Upon exiting the Kalman loop 132, the program performs step 118 and then step 152 where a decision is rendered on whether "k" is greater than the total number of satellites in the system plus one (in this illustrative example, 25). When "k" is greater than 25 the program resumes its normal frame processing operations, the same operations that are carried out when the transmission loop 114 is bypassed by step 110. The frame processing operations are depicted in FIG. 4B. The operational flow from the steps shown in FIG. 4A to the steps shown in FIG. 4B occurs by way of either of two paths, 154a or 154b.

In FIG. 4B, the frame processing operations are shown as a series of steps 156, including: determining if 12 hours have passed since the beginning of the simulation or since a previous 12 hour period (step 158). If it is determined that 12 hours have passed, the sum of the ensemble clock offsets from Universal Time is calculated, and the steering signal is updated (Step 160). Regardless of the frame count, satellite No. 1 phase locked loop is propagated (step 162); and ephemeris, clock, and Kalman filter parameters are propagated (step 164); and the steering signal is propagated (step 166); and the frame counters are incremented (step 166).

Upon completing the frame processing steps 156, the program checks to see if a complete transmission period has elapsed (step 168). If the period has not elapsed, the program begins another iteration of the frame loop 108. If a transmission period has elapsed, the program checks to see if 1 hour has elapsed since the beginning of the simulation or since a previous 1 hour period (step 170), in which case the program would perform an hourly dump of the clock parameters (step 172). After the hourly dump, or after step 170, as the case may be, the program checks to see if the simulation has run the designated number of frames (step 174). If the simulation has not run the designated number of frames, the program begins another iteration of the main loop 104. If the simulation has run the designated number of frames, two operations are performed before the program ends at step 180. The phase data from satellite No. 1's VCXO is dumped (step 176), and the RMS frequency drift, or "Allan Variance", of the VCXO is computed (step 178) over delays of 36 to 720,000 seconds.

The results of the first simulation are shown in FIG. 5 where the phase of the ensemble clocks as compared to Universal Time is shown—specifically—the transient response of a representative ensemble clock and the steady state response for all the ensemble clocks. As can be seen from the figure, the ensemble clocks go through a 30 day transient period after which they reach a steady state and remain, generally, within 5 nanosec of Universal Time. It can also be seen from FIG. 5, that the deviation among ensemble clocks remains at about 1 nanosec after the steady state is reached. In the second simulation the ensemble clocks remained, generally, within 10 nanosec of Universal Time once the steady state is reached. As was the case in the first simulation, the deviation among the ensemble clocks is approximately 1 nanosec.

Figure 7:
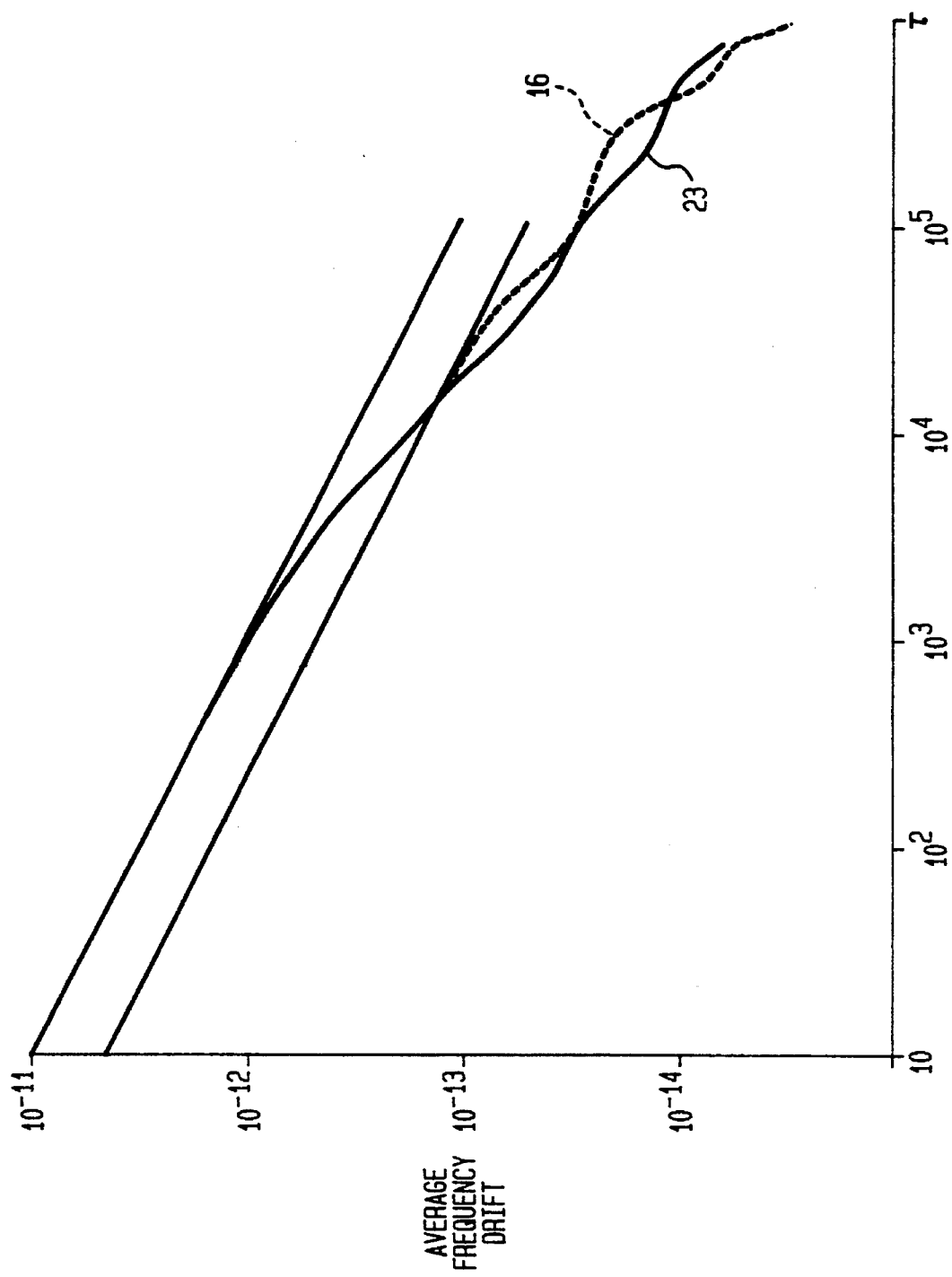
FIG. 7 is a graph depicting the frequency drift over time of an ensemble clock.

In FIG. 7, the average frequency drift over time of an ensemble clock is shown for both simulations. For comparison purposes the frequency variance of a Cesium atomic clock and a Rubidium atomic clock are also shown. As can be seen from the figure, the ensemble clock taken on Cesium standards matches the performance of a Cesium standard and exceeds it at time lags greater than 1000 seconds, as the Kalman algorithm takes hold.

Figure 8:
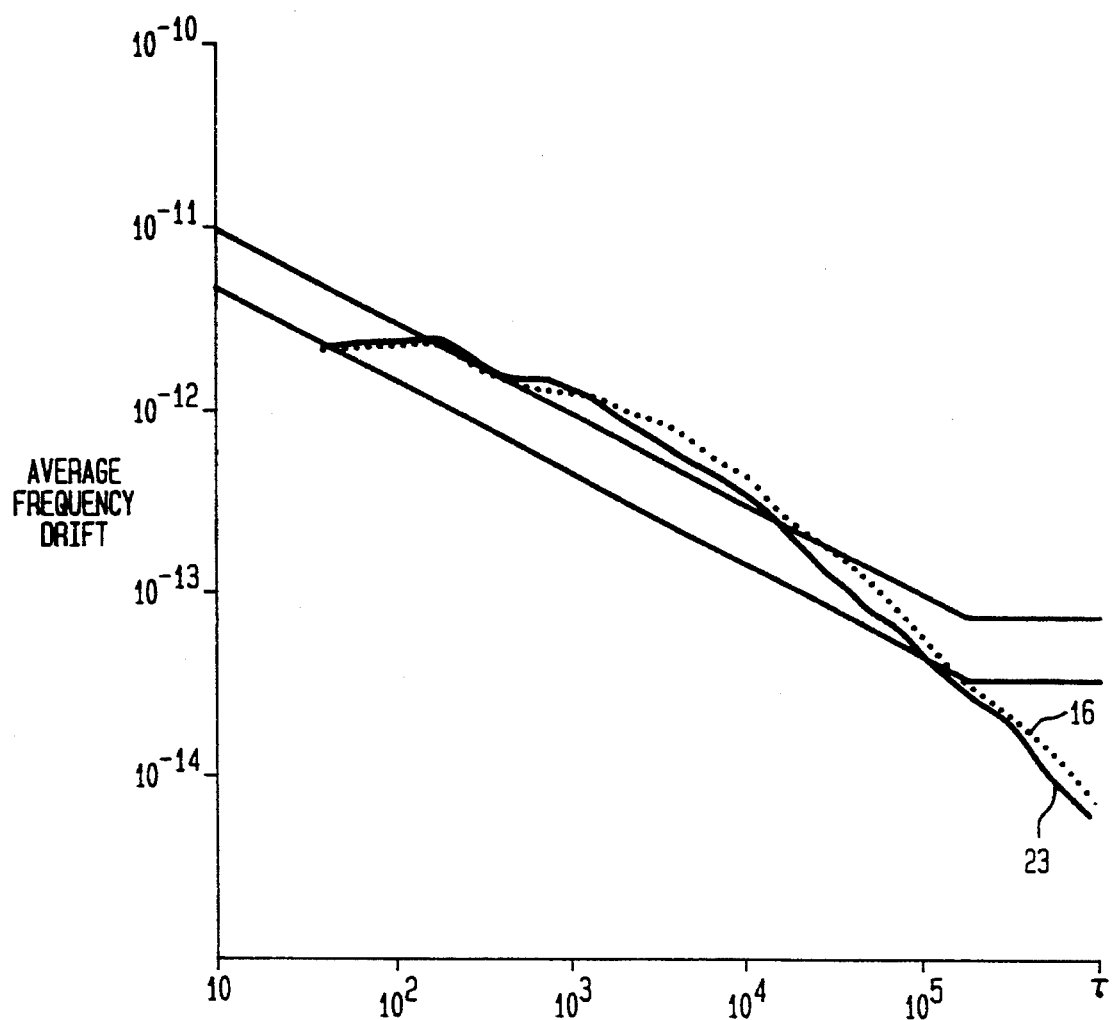
FIG. 8 is a graph depicting the frequency drift over time of a phase locked loop.

In FIG. 8 the average frequency drift over time of the phase locked loop depicted in FIG. 4 is shown. The phase locked loop holds the VCXO near but not under the Cesium specification on the interval from 150 to 15000 sec. Above 15000 sec the Kalman algorithm drives the response below the Cesium specification.

As can be seen from the graphical performance data of FIGS. 5 through 8, the RF Link Control of Satellite Clocks, disclosed herein, will enable a multi-satellite system to maintain a precise and synchronized time reference standard at a performance level equivalent to a system based on the use of atomic clocks in each such satellite while permitting some portion of the satellites to operate without an on-board atomic clock.

Herein, an RF Link Control of Satellite Clocks has been described. Although the present embodiment of the invention has been described in detail, it should be understood that various changes, alterations, and substitutions can be made therein without departing from the spirit and scope of the invention as defined by the appended claims.

We claim:

1. A method for maintaining a time standard among a plurality of orbiting satellites, each of said satellites including at least one timing reference, comprising the steps of:

crosslinking said satellites with communication crosslinks in order that said satellites can communicate with each other;

transmitting timing reference data across said communication crosslinks to communicate said data among said satellites, said satellites processing said timing reference data in a predetermined manner to produce a set of ensemble timing references at said satellites, whereby the deviation among said ensemble timing references is less than the deviation among said timing references;

transmitting said ensemble timing references from said satellites to a location where a time standard is maintained;

deriving an offset between said transmitted ensemble timing references and said time standard;

transmitting said offset from said location to said satellites, wherein only a predetermined number of said satellites receive said offset from said location;

transmitting said offset, received by said predetermined number of said satellites said satellites, across said communication cross links to said satellites which did not receive said offset from said location; and using said offset to lock said ensemble timing references to said time standard, thereby creating a corrected system time.

2. The method according to claim 1, wherein said predetermined manner comprises the steps of:

running a Kalman process at each of said satellites to generate a plurality of local phase offsets, one at each of said satellites; and adding each of said local phase offsets to its respective timing reference to derive an ensemble timing reference for each of said satellites.

3. The method according to claim 1, wherein said transmission from each of said satellites to said location is achieved by way of radio frequency transmission using L band frequencies.

4. The method according to claim 1, wherein said transmission from said location to said satellites is achieved by way of radio frequency transmission using S band frequencies.

5. The method according to claim 1, wherein the step of using said offset to lock said ensemble timing references to said time standard, comprises the steps of:

filtering said offset to obtain a steering signal; and using said steering signal and said ensemble timing references as input to a Kalman process that functions to anchor said ensemble timing references to said time standard.

6. A method for maintaining a time standard among a plurality of orbiting satellites, said plurality of orbiting satellites comprising a first set of satellites, wherein each satellite includes at least one timing reference, and a second set of satellites, wherein each satellite includes a timing means, comprising the steps of:

crosslinking said first set of satellites, said second set of satellites, and said first and second set of satellites, with communication crosslinks in order that said satellites can communicate with each other;

transmitting timing reference data across said communication crosslinks to communicate said data among said first set of satellites and processing said timing reference data in a predetermined manner to produce a set of ensemble timing references for said first set of satellites, whereby the deviation among said ensemble timing references is less than the deviation among said timing references of said first set of satellites;

transmitting said ensemble timing references from said first set of satellites to a location where a time standard is maintained;

deriving an offset between said transmitted ensemble timing references and said time standard;

transmitting said offset from said location to said first set of satellites, wherein only a predetermined number of said first set of satellites receive said offset from said location;

transmitting said offset, received by said predetermined number of said first set of satellites, across said communication crosslinks to said first set of satellites which did not receive said offset from said location;

using said offset to lock said ensemble timing references of said first set of satellites to said time standard, thereby creating a corrected system time;

providing a phase locked loop in each satellite of said second set of satellites;

transmitting said corrected system time across said communication crosslinks from said first set of satellites to each satellite of said second set of satellites; and using said corrected system time in combination with said phase locked loops to lock said timing means of said second set of satellites to said corrected system time.

7. The method according to claim 6, wherein said predetermined manner comprises the steps of:

running a Kalman process at each of said first set of satellites to generate a plurality of local phase offsets, one at each satellite of said first set of satellites; and adding each of said local phase offsets to its respective timing reference to derive an ensemble timing reference for each satellite of said first set of satellites.

8. The method according to claim 6, wherein said transmission from said first set of satellites to said location is achieved by way of radio frequency transmission using L band frequencies.

9. The method according to claim 6, wherein said transmission from said location to said first set of satellites is achieved by way of radio frequency transmissions using S band frequencies.

10. The method according to claim 6, wherein said step of using said offset to lock said ensemble timing references to said time standard, comprises the steps of:

filtering said offset to obtain a steering signal; and using said steering signal and said ensemble timing references as input to a Kalman process that functions to anchor said ensemble timing references to said time standard.

11. An RF Link Control apparatus for maintaining a time standard among a plurality of orbiting satellites, each of said satellites including at least one timing reference, comprising:

means for computing an ensemble timing reference at each of said satellites, whereby the deviation among said ensemble timing references is less than the deviation among said timing references;

means for transmitting said ensemble timing references from said satellites to a location where a time standard is maintained, said ensemble timing references to be used at said location to derive an offset between said ensemble timing references and said time standard;

means for transmitting said offset from said location to said satellites;

means for generating a steering signal from said offset, said steering signal to be used at said satellites to lock said ensemble timing references to said time standard, thereby creating a corrected system time; and a plurality of communication crosslinks between said satellites for transferring timing reference data among said satellites.

12. An RF Link Control apparatus according to claim 11, wherein said means for computing an ensemble timing reference at each of said satellites comprises:

a processor associated with each said satellite, said processor operating to implement a Kalman algorithm for computing a phase offset between timing reference data received over said communication crosslinks and a receiving satellite's time reference, said phase offset to be added to said receiving satellite's timing reference to generate said ensemble timing reference.

13. An RF Link Control apparatus according to claim 11, wherein said means for transmitting said ensemble timing references from said satellites to a location where a time standard is maintained, comprises:

an L band transmitter associated with each of said satellites; and an L band receiver at said location.

14. An RF Link Control apparatus according to claim 11, wherein said means for transmitting said offset from said location to said satellites comprises:

an S band transmitter at said location; and an S band receiver associated with each of said satellites.

15. An RF Link Control apparatus according to claim 11, wherein said means for generating a steering signal from said offset comprises:

a steering filter associated with each of said satellites for filtering said offset to create a filtered offset; and a processor associated with each of said satellites, said processor operating to lock said ensemble timing references to said time standard through implementation of a Kalman algorithm.

16. An RF Link Control apparatus for maintaining a time standard among a plurality of orbiting satellites, said plurality of orbiting satellites comprising a first set of satellites, wherein each satellite includes at least one timing reference, and a second set of satellites, wherein each satellite includes at least one timing means, comprising:

means for computing an ensemble timing reference at each satellite of said first set of satellites, the deviation among said ensemble timing references is less than the deviation among said timing references;

means for transmitting said ensemble timing references from each satellite of said first set of satellites to a location where a time standard is maintained, said ensemble timing references to be used at said location to derive an offset between said ensemble timing references and said time standard;

means for transmitting said offset from said location to said first set of satellites;

means for generating a steering signal from said offset, said steering signal to be used at said first set of satellites to lock said ensemble timing references to said time standard, thereby creating a corrected system time;

a first plurality of communication crosslinks between said satellites of said first set, a second plurality of communication crosslinks between said satellites of second set and a third plurality of communication crosslinks between said first and second sets of said satellites, for transferring timing reference data among said satellites; and means for locking said timing means of said second set of satellites to said corrected system time.

17. An RF Link Control apparatus according to claim 16, wherein said means for locking said timing means of said second set of satellites to said corrected system time comprises:

a phase locked loop associated with each satellite of said second set of satellites; and means for transmitting said corrected system time from said first set of satellites to each satellite of said second set of satellites such that the system accuracy is not significantly degraded as compared to a constellation consisting soley of said first set of satellites.

18. An RF Link Control apparatus according to claim 17, wherein said phase locked loop comprises:

a phase meter;

a second order estimator; and a voltage controlled oscillator.

19. An RF Link Control apparatus according to claim 18, wherein said second order estimator comprises:

a smoothing circuit for removing high frequency noise from a signal input to said second order estimator;

a drift compensation circuit that operates to compensate for frequency drift in said voltage controlled oscillator; and an estimator circuit for generating a signal for use as input to said voltage controlled oscillator.

20. An RF Link Control apparatus according to claim 19, wherein said voltage controlled oscillator further comprises a phase table in which the output phase of said oscillator may be stored.

\* \* \* \* \*